US011885422B2

(12) United States Patent
Kim et al.

(10) Patent No.: US 11,885,422 B2
(45) Date of Patent: Jan. 30, 2024

(54) DOUBLE SEALING CHECK VALVE FOR RICE COOKER

(71) Applicant: Cuckoo Electronics Co., Ltd., Gyeongsangnam-do (KR)

(72) Inventors: Suk Kim, Yangsan-si (KR); Won Joo Kim, Yangsan-si (KR); You Jin Shin, Yangsan-si (KR)

(73) Assignee: Cuckoo Electronics Co., Ltd.

( * ) Notice: Subject to any disclaimer, the term of this patent is extended or adjusted under 35 U.S.C. 154(b) by 0 days.

(21) Appl. No.: 17/939,213

(22) Filed: Sep. 7, 2022

(65) Prior Publication Data

US 2023/0081883 A1 Mar. 16, 2023

(30) Foreign Application Priority Data

Sep. 10, 2021 (KR) .................. 10-2021-0120988

(51) Int. Cl.
*A47J 27/09* (2006.01)
*F16K 15/06* (2006.01)

(52) U.S. Cl.
CPC ............. *F16K 15/066* (2013.01); *A47J 27/09* (2013.01)

(58) Field of Classification Search
CPC ......... A47J 27/09; A47J 36/06; F16K 15/066; Y10T 137/7846
See application file for complete search history.

(56) References Cited

U.S. PATENT DOCUMENTS 2,784,561 A * 3/1957 Postlewait .............. F16K 21/18
137/538
3,209,746 A * 10/1965 Giuseppe ................ A47J 36/36
126/374.1
(Continued)

FOREIGN PATENT DOCUMENTS

KR 101809188 B1 1/2018

*Primary Examiner* — Kevin F Murphy
(74) *Attorney, Agent, or Firm* — Luedeka Neely, P.C.

(57) ABSTRACT

The present disclosure relates to a double sealing check valve for a rice cooker, and more particularly, to a double sealing check valve for a rice cooker that prevents water vapor mixed with rice water and grain dregs from entering the check valve and maintains airtightness during cooking in an automatic water supply type pressure cooker that automatically supplies water and performs pressure cooking.

The double sealing check valve for a rice cooker that is mounted on a lid of a rice cooker to prevent leakage of steam generated during cooking, including: an upper part having a plate shape and including a water supply portion; a check valve opening and closing the water supply portion of the upper part by a vertical movement; a lower part coupled to the upper part, allowing the check valve to be installed to be movable up and down therein, and having a flow path and a water outlet to allow water introduced through the water supply portion to be discharged; and an elastic member having both ends fixed to the upper part and the lower part and pressing the check valve in a direction in which the check valve closes the water supply portion, wherein the check valve includes a first part opening and closing the water supply portion of the upper part and a second part opening and closing the water outlet of the lower part.

10 Claims, 15 Drawing Sheets

(56) References Cited

U.S. PATENT DOCUMENTS

| | | | | |
|---|---|---|---|---|
| 3,542,063 A | * | 11/1970 | Etter | F16K 17/065 |
| | | | | 137/329.06 |
| 8,136,546 B2 | * | 3/2012 | Griffiths | F16K 17/04 |
| | | | | 251/366 |
| 10,221,965 B2 | * | 3/2019 | Wyatt | F16K 47/08 |

* cited by examiner

DOUBLE SEALING CHECK VALVE FOR RICE COOKER

TECHNICAL FIELD

The present disclosure relates to a double sealing check valve for a rice cooker, and more particularly, to a double sealing check valve for a rice cooker that prevents water vapor mixed with rice water and grain dregs from entering the check valve and maintains airtightness during cooking in an automatic water supply type pressure cooker that automatically supplies water and performs pressure cooking.

BACKGROUND ART

Recently, many automatic rice cookers that increase the degree of automation of a cooking process and provide convenience to users by automatically supplying water, automatically supplying rice and water, or automatically supplying rice, washing rice, supplying water and draining water, have been developed.

FIGS. 1 and 2 are views illustrating a valve module of a lid device for a fully automatic rice cooker according to the related art. The valve body 1 includes three ports protruding side by side in parallel from one side. Specifically, a water input port 2a protrudes from one side of the valve body 1 to be connected to a first flow path 2. The water input port 2a may be connected to a water supply portion, such as a faucet, by a hose or the like. In addition, an external air inlet port 4a and a steam outlet port 10a protrude from one side of the valve body 1 on both sides of the water input port 2a. The external air inlet port 4a is configured to be connected to a second flow path 4, and the steam discharge port 10a is configured to be connected to a fifth flow path 10.

The first flow path 2 is formed in the valve body 1 and is connected to the water input port 2a. A sliding pipe 24 is installed in the first flow path 2, a movable bar 26 inserted into and guided in the sliding pipe 24 is installed, and a check valve 20 is disposed at one end of the movable bar 26, and a spring 22 is configured to connect the check valve 20 to the sliding pipe 24, so that the check valve 20 is installed to provide an elastic force opposite to a direction in which water flows into the first flow path 2. Accordingly, when water is introduced into the first flow path 2, the check valve 20 retracts to be opened as a flow of water overcomes elastic force of the spring 22, and when the introduction of water is stopped, the check valve 20 is returned to an original position thereof by elastic force of the spring 22 to block and close the flow path.

Meanwhile, the third flow path 6 has one end formed to connect an inner end of the first flow path 2 and an inner end of the second flow path 4, is connected to an inlet/outlet port formed to protrude downwardly through the rice cooker lid body, and is formed in a vertical direction inside the body 1.

Since the check valve 20 opens and closes only the water input port 2a by the flow of water, steam mixed with rice water or grain dregs generated during a cooking process flows into the third flow path 6 through the inlet/outlet port. The inlet/outlet port serves as a port through which water for cooking is discharged to the rice cooker, residual pressure steam is introduced from the rice cooker, washing water is discharged, and external air is introduced.

At this time, since no opening/closing valve is formed between the first flow path 2 and the check valve 20, steam mixed with rice water or grain dregs introduced into the third flow path 6 may be introduced to be stacked on a rear surface of the check valve 20, the spring 22, the sliding pipe 24, and the movable bar 26. Thus, the rear surface of the check valve 20, the spring 22, the sliding pipe 24, and the movable bar 26 may be contaminated, resulting in sanitary problems. In addition, the spring 22 may be deformed by high-temperature and high-pressure steam or may be restrained or interfered in movement due to rice water or grain dregs, so that of the check valve 20 may not be performed normally.

RELATED ART DOCUMENT

Patent Document

Korean Patent Registration No. 10-1809188

DISCLOSURE OF THE INVENTION

An aspect of the present disclosure is to provide a double sealing check valve for a rice cooker that may self-block steam generated during cooking, as a check valve for water supply.

In an aspect, a double sealing check valve for a rice cooker that is mounted on a lid of a rice cooker to prevent leakage of steam generated during cooking, including: an upper part having a plate shape and including a water supply portion; a check valve opening and closing the water supply portion of the upper part by a vertical movement; a lower part coupled to the upper part, allowing the check valve to be installed to be movable up and down therein, and having a flow path and a water outlet to allow water introduced through the water supply portion to be discharged; and an elastic member having both ends fixed to the upper part and the lower part and pressing the check valve in a direction in which the check valve closes the water supply portion, wherein the check valve includes a first part opening and closing the water supply portion of the upper part and a second part opening and closing the water outlet of the lower part.

The double sealing check valve for a rice cooker provided by the present disclosure not only closes a flow path from a water supply port to a rice cooker, but also blocks steam from flowing from the rice cooker toward the check valve, thereby preventing the parts of the check valve from being corroded or rusted to deteriorate a function thereof and grain dregs from being caught between the parts of the check valve to restrict or obstruct a movement of the check valve to inhibit a normal operation.

In addition, the double sealing check valve for a rice cooker provided by the present disclosure may prevent steam mixed with rice water or grain dregs from flowing toward a water supply flow path to contaminate a flow path. Therefore, hygienic water supply may be provided.

In addition, the double sealing check valve for a rice cooker provided by the present disclosure may increase internal pressure sealing properties to maintain high pressure, thereby providing delicious rice with good texture.

BEST MODE FOR CARRYING OUT THE INVENTION

Hereinafter, the present disclosure will be described in more detail with reference to the drawings.

Figure 1:
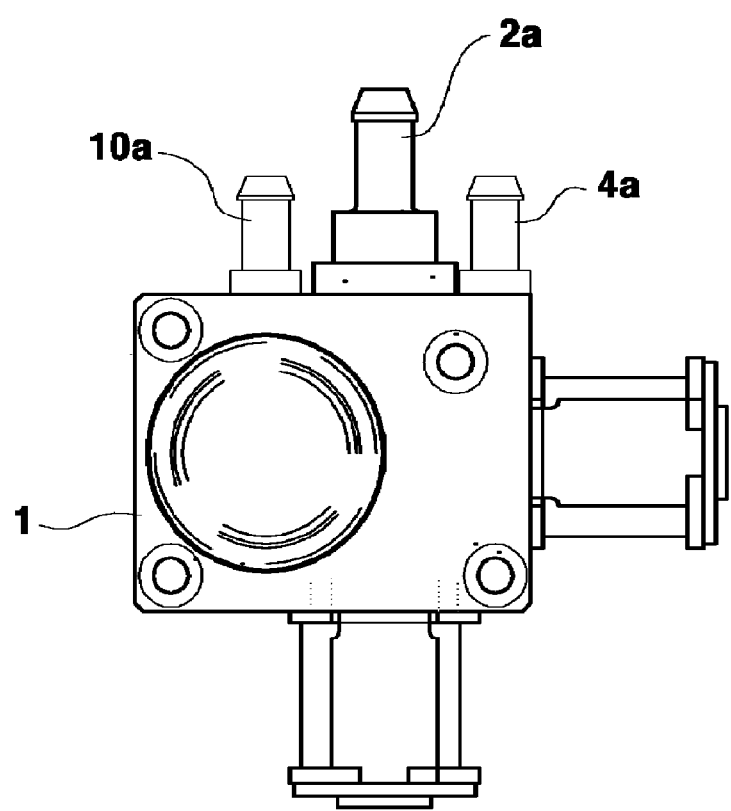
FIG. 1 is a plan view illustrating a valve module of a lid device for a fully automatic rice cooker in the related art.
Figure 2:
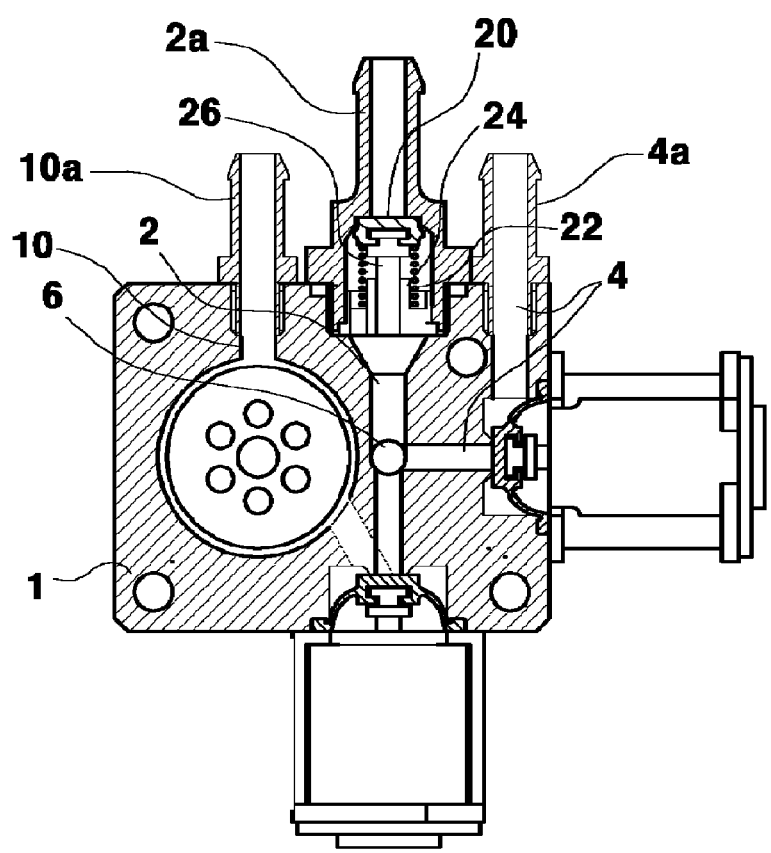
FIG. 2 is a plan cross-sectional view illustrating a valve module of a lid device for a fully automatic rice cooker in the related art.
Figure 3:
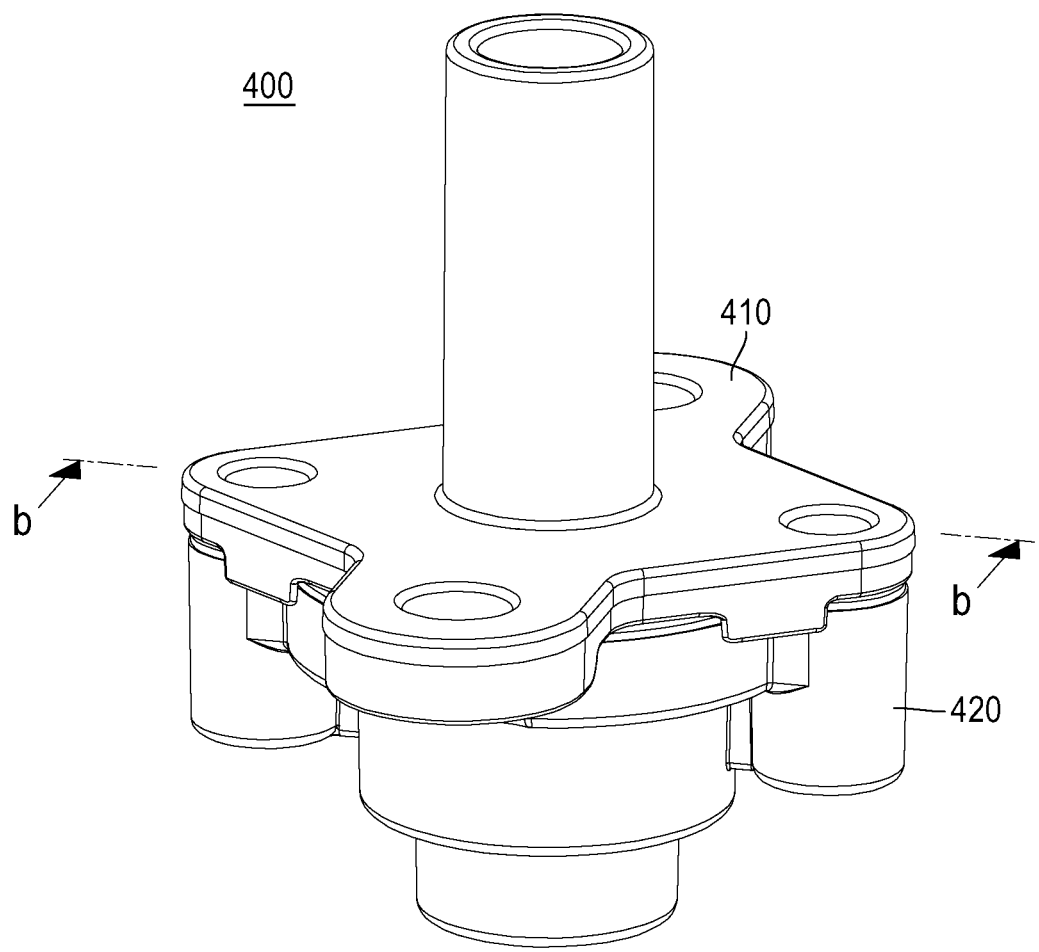
FIG. 3 is a perspective view of a double sealing check valve for a rice cooker according to a first embodiment of the present disclosure.
Figure 4:
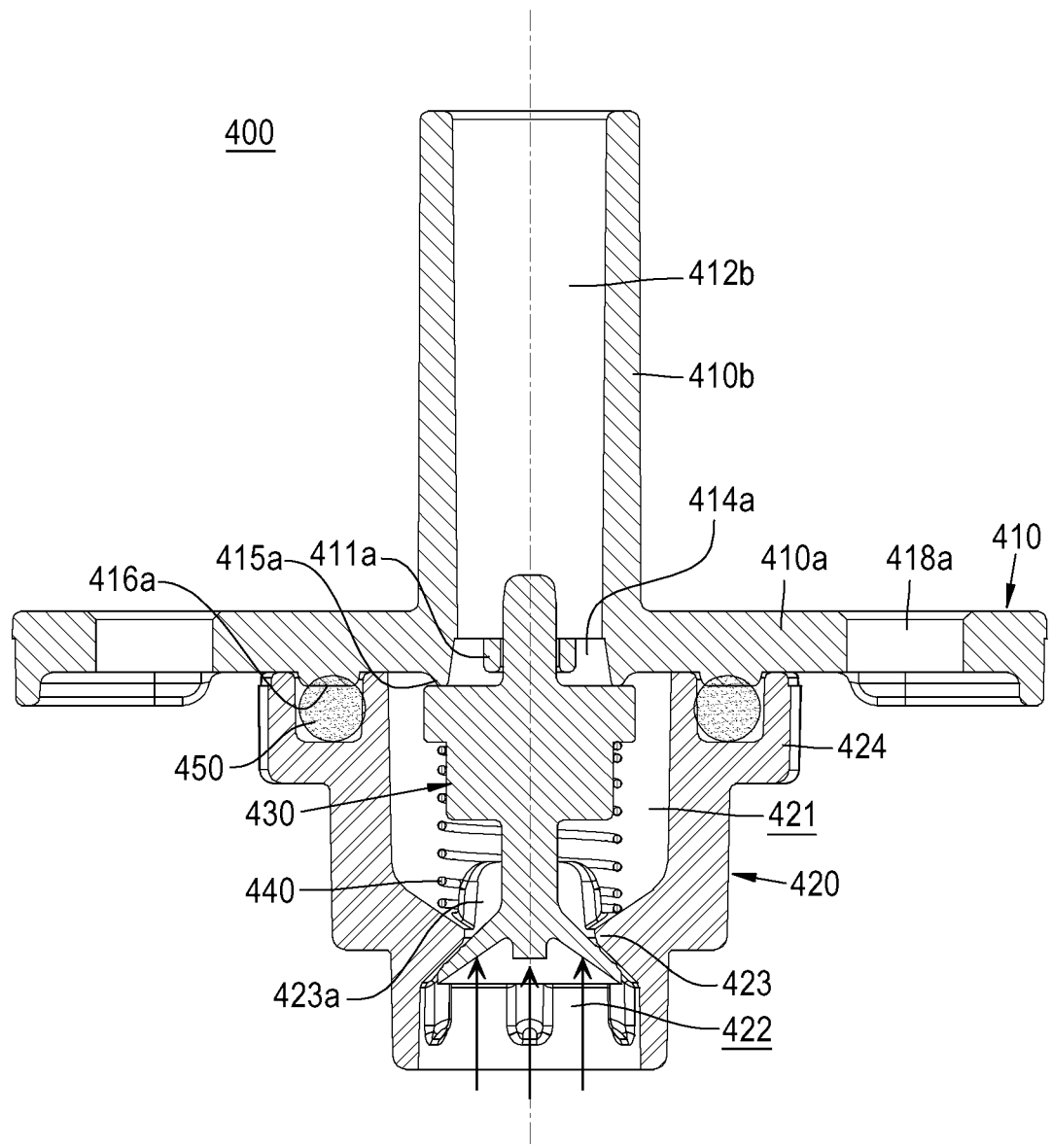
FIG. 4 is a cross-sectional view taken along line b-b of FIG. 3.

FIG. 3 is a perspective view of a double sealing check valve fora rice cooker according to a first embodiment of the present disclosure, and FIG. 4 is a cross-sectional view taken along line b-b of FIG. 3.

A double sealing check valve 400 for a rice cooker according to the first embodiment of the present disclosure includes an upper part 410 having a plate shape and including a water supply portion 410b for supplying water in the center and a lower part 420 coupled to the upper part 410 to form a certain space 421 and including a water outlet portion 422 through which water introduced through the water supply portion 410b is discharged.

A check valve 430 is installed in the space 421 defined by the upper part 410 and the lower part 420, and the check valve 430 moves up and down in the space 421 to open or close the water supply portion 410b and the water outlet portion 422. The check valve 430 is upwardly forced by the elastic member 440, and thus the check valve 430 always closes the water supply portion 410b and the water outlet portion 422 by the elastic member 440. When water is introduced through the water supply flow path 412b formed at the water supply portion 410b and water pressure is greater than pressure applied to the check valve 430 by the elastic member 440, the check valve 430 moves downwardly, the water supply portion 410b and the water outlet portion 422 are opened, and water is introduced into the rice cooker. When the supply of water is stopped, the check valve 430 moves upwardly by a restoring force of the elastic member 440, and accordingly, both the water supply portion 410b and the water outlet portion 422 are dosed.

Meanwhile, during cooking, an inner pot is heated and internal pressure increases while steam is generated, so that the check valve 430 is pressurized upwardly by pressure of the steam to come into close contact with and seal the water outlet portion 422. Therefore, inflow of steam mixed with rice water or grain dregs generated during the cooking process into the check valve 430 may be prevented and the internal pressure may be maintained at a high pressure.

Figure 5:
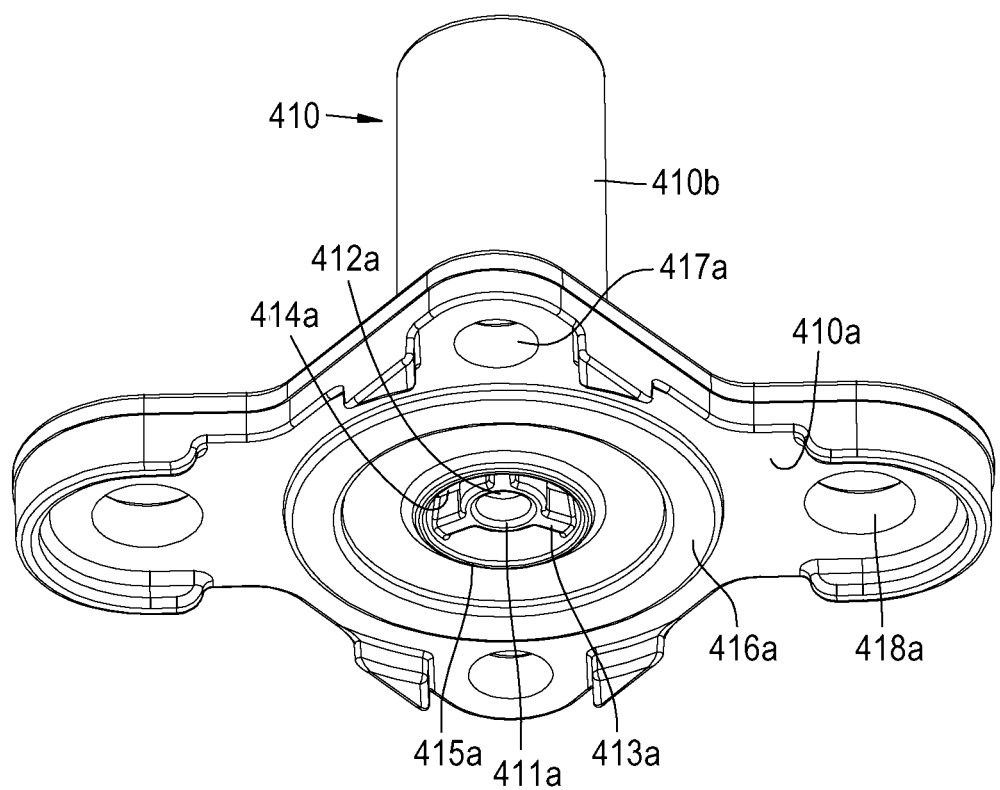
FIG. 5 is a bottom perspective view of an upper part of a double sealing check valve for a rice cooker according to the first embodiment of the present disclosure.

FIG. 5 is a bottom perspective view of the upper part of the double sealing check valve provided in the rice cooker according to the first embodiment of the present disclosure. Referring to FIGS. 4 and 5, in the upper part 410, the water supply portion 410b is formed in the center of a plate portion 410a. The water supply portion 410b has a pipe shape protruding upwardly from the plate portion 410a and forms a water supply flow path 412b through which water flows. An upper end of the water supply portion 410b is connected to a water supply source (not shown), and a lower end of the water supply portion 410b communicates with the space 421 of the lower part 420. A lower end of the water supply portion 410b is provided with a guide hole 412a for guiding a guide protrusion 431a of the check valve 430, which will be described later, and one or more water supply ports 414a formed on an outer periphery of the guide hole 412a. The guide hole 412a is formed by a cylindrical guide body 411a, and the guide body 411a is supported at a lower end of the water supply portion 410b by a support 413. Due to the presence of the support 413a, a plurality of water supply ports 414a are partitioned.

The plate portion 410a includes a first rib 415a protruding downwardly around the lower end of the water supply portion 410b, and the first rib 415a increases contact pressure with the check valve 430 to improve watertightness. In addition, in order to improve watertightness of an O-ring 450 interposed in a coupling surface with the lower part 420, a second rib 416a pressing the O-ring 450 protrudes downwardly and concentrically formed to be spaced apart from the first rib 415a.

In addition, the plate portion 410a is provided with a first fastening hole 417a for fastening with the lower part 420 (refer to FIG. 4) and a second fastening hole 418a for fastening with a fixing plate 460 (refer to FIG. 11) to be described later. The fixing plate 460 and the lower part 420 also have fastening holes at positions corresponding to the first and second fastening holes 417a and 418a, respectively, and are screwed by screws passing through the fastening holes.

Figure 6:
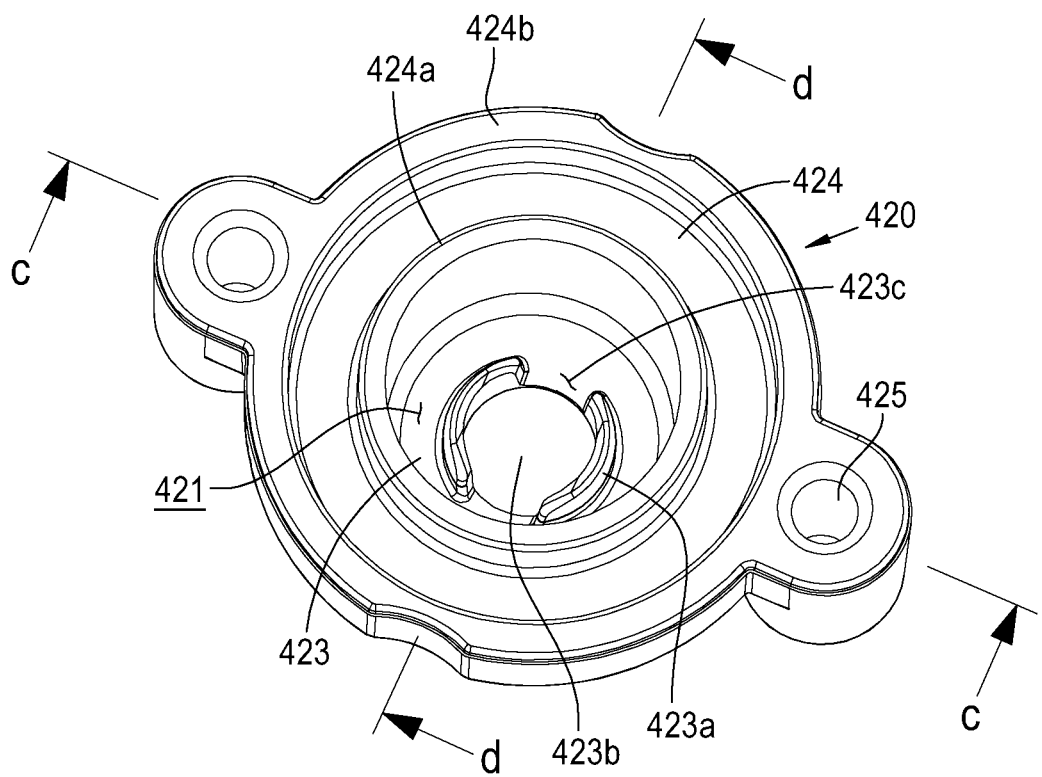
FIG. 6 is a top perspective view of a lower part of a double sealing check valve for a rice cooker according to the first embodiment of the present disclosure.
Figure 7:
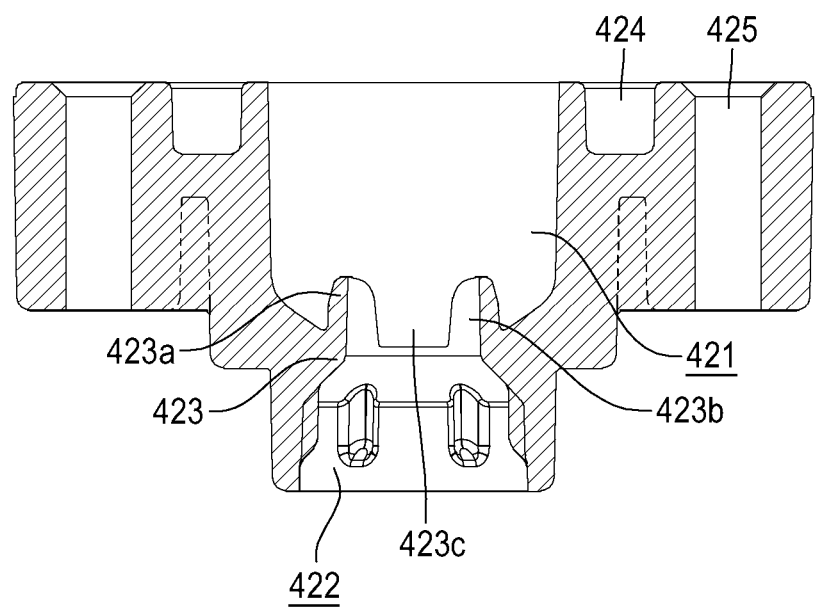
FIG. 7 is a cross-sectional view taken along line c-c of FIG. 6.
Figure 8:
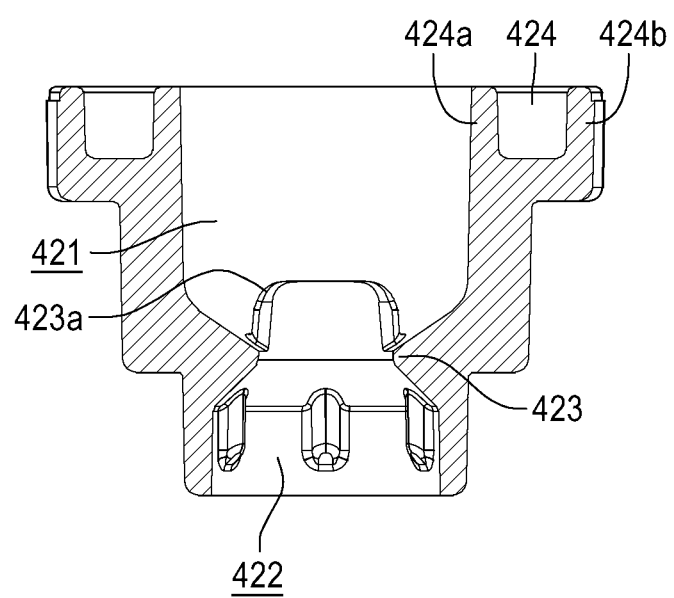
FIG. 8 is a cross-sectional view taken along line d-d of FIG. 6.

FIG. 6 is a top perspective view of the lower part of the double sealing check valve for a rice cooker according to the first embodiment of the present disclosure, FIG. 7 is a cross-sectional view taken along line c-c of FIG. 6, and FIG. 8 is a cross-sectional view taken along line d-d of FIG. 6.

The lower part 420 is coupled to the upper part 410, and the space 421 in which the check valve 430 may be installed is formed. The space 421 is formed to be larger than the check valve 430, so that a flow path through which supplied water flows is formed between the space 421 and the check valve 430.

The lower part 420 includes an O-ring receiving portion 424 for placing an O-ring 450 on a surface in contact with the upper part 410 for sealing, when coupled with the upper part 410. The O-ring receiving portion 424 is formed of a concave space between an inner wall 424a and an outer wall 424b, and the O-ring 450 is inserted into the O-ring receiving portion 424.

In addition, a fastening hole 425 is formed in an extension protruding outwardly of the O-ring receiving portion 424. The fastening hole 425 is aligned with the first fastening hole 417a of the upper part 410 described above, and the lower part 420 is coupled to the upper part 410 by a screw coupled to both the fastening hole 425 and the first fastening hole 417a.

The space 421 communicates with the water supply port 414a of the upper part, and the water outlet portion 422 is formed at a lower end of the lower part 420.

Between the space 421 and the water outlet portion 422, there is a small-diameter portion 423 that narrows a diameter and forms an inclined surface. Here, the small-diameter portion 423 is defined to refer to a portion in which a diameter of the lower end of the space 421 is narrowed and a portion in which a diameter of the upper end of the water outlet portion 422 is gradually increased. That is, an upper portion of the small-diameter portion 423 is a portion of the space 421, and a lower portion of the small-diameter portion 423 is a portion of the water outlet portion 422. The small-diameter portion 423 is formed to be inclined such that a central portion has the narrowest diameter and the diameter gradually increases toward the top and bottom. That is, the diameter narrows downwardly in the space 421, and the diameter gradually increases in the water outlet portion 422.

A shaft hole 423b through which a shaft portion 433 of the check valve 430, which will be described later, passes is formed in the center of the small-diameter portion 423. The shaft portion 433 of the check valve 430 passes through the shaft hole 423b, and the second part 432 of the check valve 430 located at the water outlet portion 422 moves up and down by a movement of the shaft portion 433 to open and close the water outlet portion 422. A guide rib 423a protruding upwardly around the shaft hole 423b of the small-diameter portion 423 is provided. Referring to FIG. 4, a lower end of the elastic member 440 is fixedly supported on an outer periphery of the guide rib 423a. In addition, a plurality of guide ribs 423a are provided, and a gap portion 423c is formed between the guide ribs 423a. The gap portion 423c serves as an outlet for sending water introduced into the space 421 to the water outlet portion 422.

When the check valve 430 retracts, an upper end of the guide rib 423a comes into contact with a lower end of an elastic member support rib 431c (refer to FIG. 9) to be described later. That is, the guide rib 423a determines a retraction position when the check valve 430 retracts.

Figure 9:
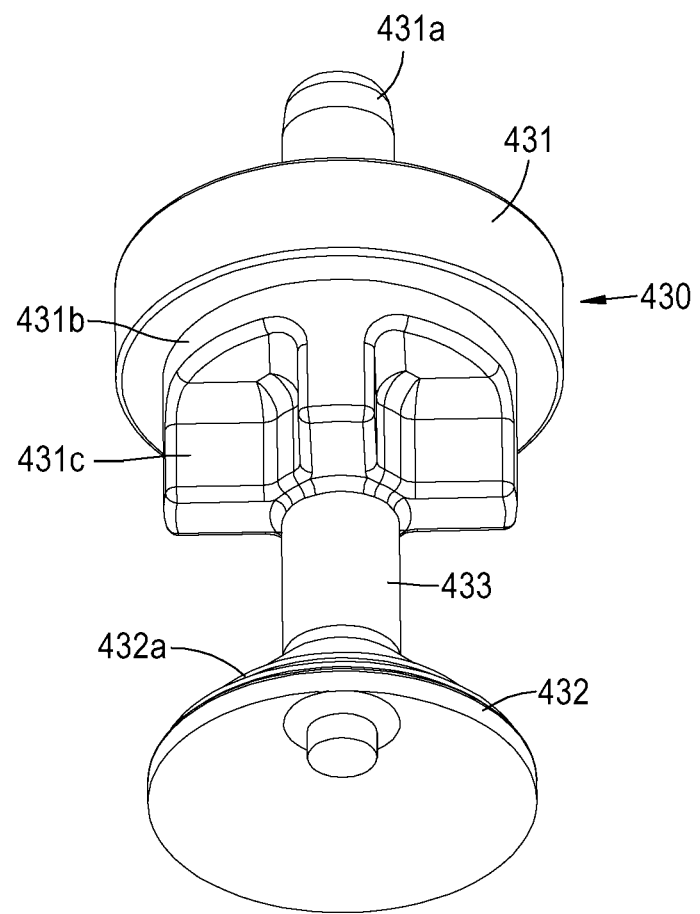
FIG. 9 is a perspective view illustrating a check valve of a double sealing check valve for a rice cooker according to the first embodiment of the present disclosure.

FIG. 9 is a perspective view illustrating a check valve of a double sealing check valve for a rice cooker according to a first embodiment of the present disclosure.

The check valve 430 may be divided into three parts, a first part 431 having a disk-like shape and opening and closing the water supply port 414a (refer to FIG. 5) of the upper part 410 (refer to FIG. 4), a second part 432 having a funnel shape with a diameter increasing downwardly and opening and closing the water outlet portion 422 of the lower part 420, and the shaft portion 433 connecting the first part 431 to the second part 432.

An upper surface of the first part 431 has a guide protrusion 431a protruding upwardly, and the guide protrusion 431a is inserted into the guide hole 412a (refer to FIG. 5) formed in the water supply portion 410b (refer to FIG. 5) of the upper part 410 (refer to FIG. 5). The guide protrusion 431a is inserted into the guide hole 412a to guide a vertical movement of the check valve 430 and prevents the first part 431 of the check valve 430 from tilting, thereby improving watertightness.

As described above, the second part 432 has a funnel shape increasing in diameter downwardly. An upper end of the water outlet portion 422, that is, the small-diameter portion 423 (refer to FIG. 8) has a funnel shape increasing in diameter downwardly, and the second part 432 and the small-diameter portion 423 are in close contact with each other to prevent steam, grain dregs, rice water, or the like from being introduced into the space 421 (refer to FIG. 4) from the rice cooker side.

In this case, the second part 432 includes an annular protruding rib 432a on an outer circumferential surface in contact with the small-diameter portion 423. The annular protruding rib 432a may come into contact with the small-diameter portion 423 to be compressed during the operation of the check valve 430, thereby improving sealing force.

The shaft portion 433 is inserted into the shaft hole 423b formed in the small-diameter portion 423 as described above to guide the vertical movement of the check valve 430. Meanwhile, a fixing end 431b having a disk-like shape and fixing an elastic member and an elastic member support rib 431c having a cross (+) shape and extending from the fixing end 431b are formed at the upper end of the shaft portion 433.

Figure 10:
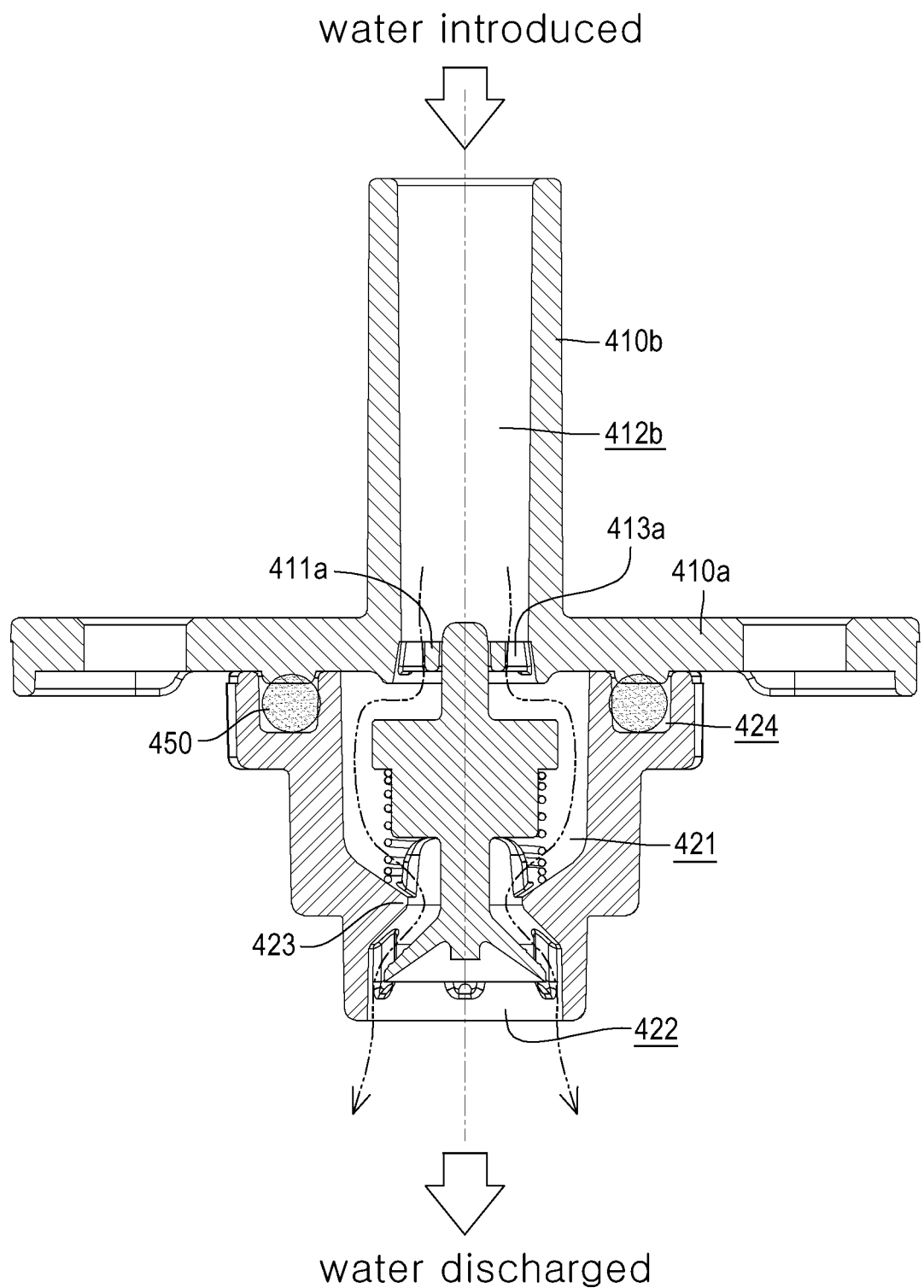
FIG. 10 is a cross-sectional view illustrating a state when a double sealing check valve for a rice cooker is opened according to the first embodiment of the present disclosure.

FIG. 10 is a cross-sectional view illustrating a state when the double sealing check valve for a rice cooker is opened according to the first embodiment of the present disclosure.

When water is introduced through the water supply flow path 412b of the water supply portion 410b, water pressure acts on the first part 431 (refer to FIG. 9) of the check valve 430. When the water pressure is greater than pressing force of the elastic member 440, the check valve 430 as a whole descends, the first part opens the water supply port 414a, and the second part opens the shaft hole 423b. Accordingly, water is introduced through the water supply flow path 412b and flows into the rice cooker through the water supply port 414a, the space 421 inside the lower part 420, the shaft hole 423b, and the water outlet portion 422.

Figure 11:
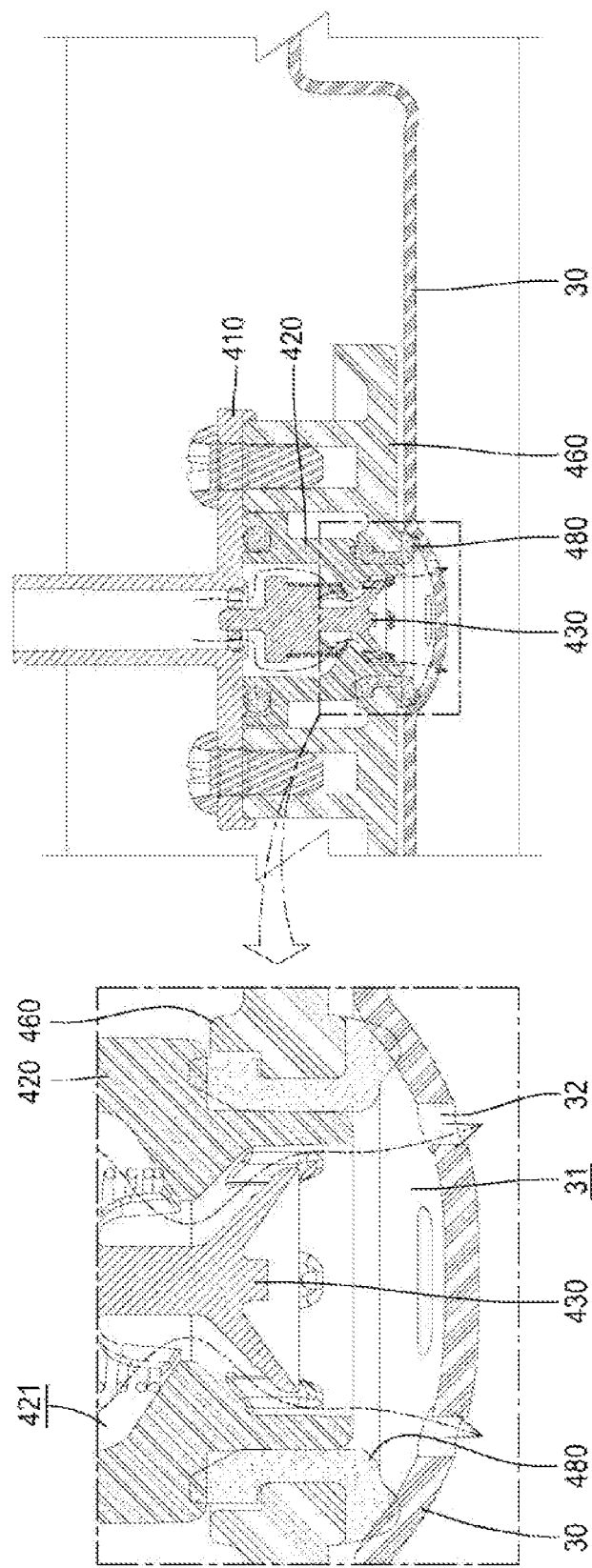
FIG. 11 is a cross-sectional view illustrating an open state after the double sealing check valve for a rice cooker according to the first embodiment of the present disclosure is coupled to a lid.
Figure 12:
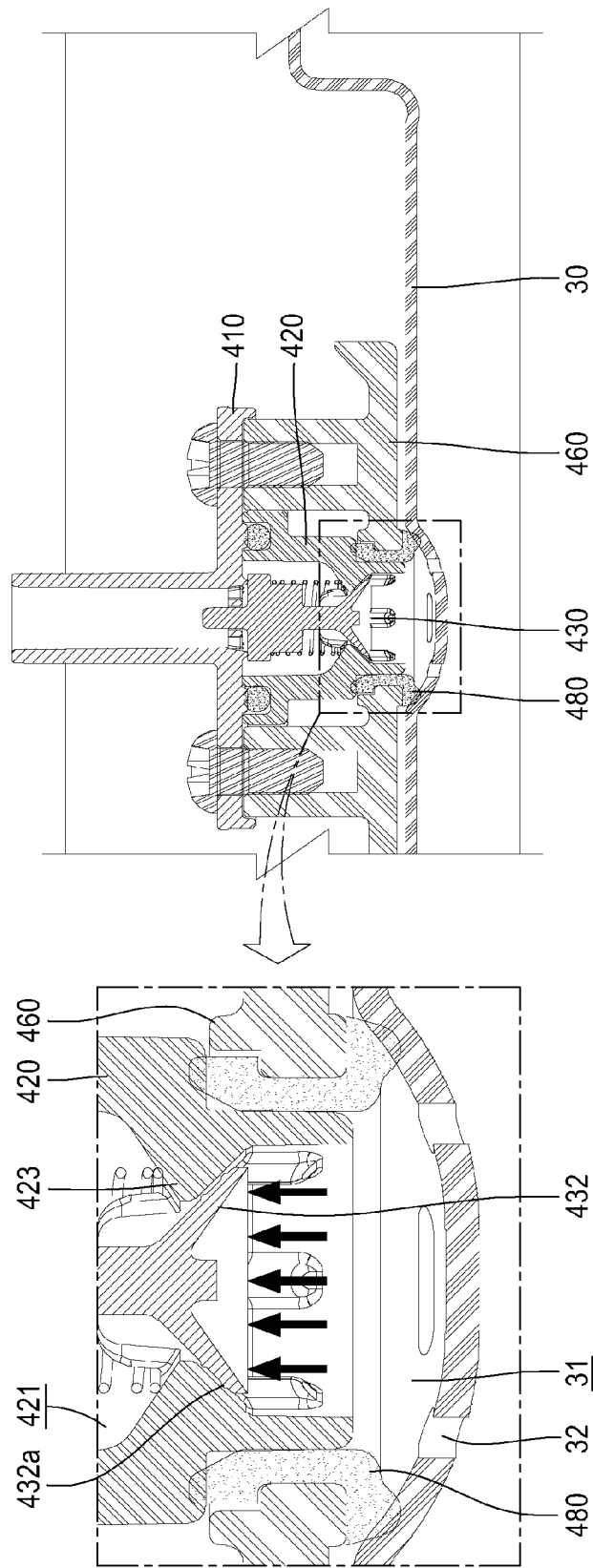
FIG. 12 is a cross-sectional view illustrating a state in which a double sealing check valve for a rice cooker according to a first embodiment of the present disclosure blocks steam after being coupled to a lid.

FIG. 11 is a cross-sectional view illustrating an open state after the double sealing check valve for a rice cooker according to the first embodiment of the present disclosure is coupled to an inner pot lid, and FIG. 12 is a cross-sectional view illustrating a state of blocking water vapor after the double sealing check valve for a rice cooker according to the first embodiment of the present disclosure is coupled to the inner pot lid.

The double sealing check valve for a rice cooker is fixed to an inner pot lid 30 by the fixing plate 460. At this time, a sealing material 480 is installed at a point where the lower part 420, the fixing plate 460, and the inner pot lid 30 contact each other to prevent outflow of water. The inner pot lid 30 is provided with a plurality of water outlets 32 through which water discharged through the lower part 420 flows into an inner pot of the rice cooker. At this time, the inner pot lid 30 has a protrusion 31 convexly protruding downwardly so that water discharged through the water outlet portion 422 may easily escape to the water outlet 32, and the protrusion 31 includes the water outlet 32.

Figure 13:
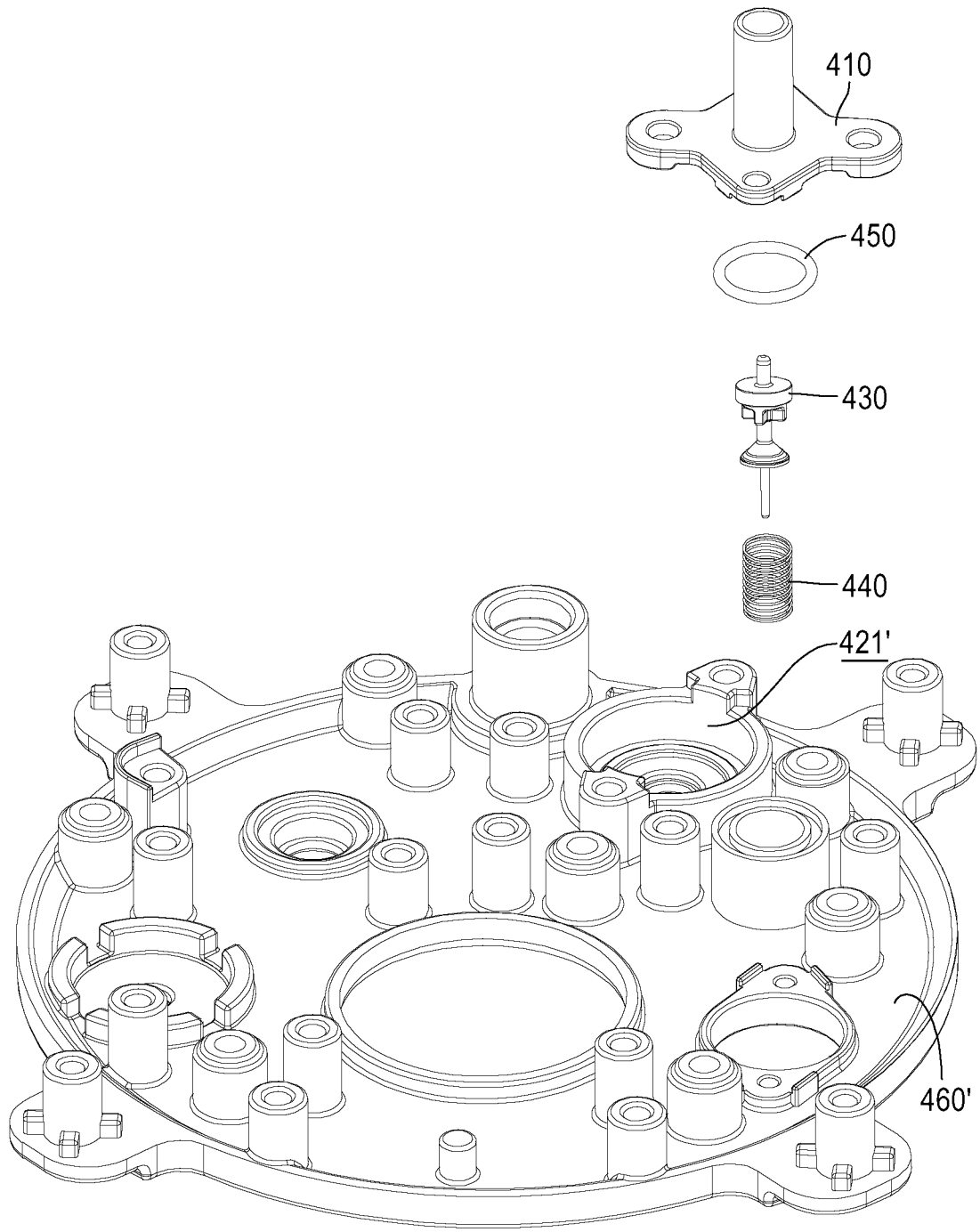
FIG. 13 is an exploded perspective view of a double sealing check valve for a rice cooker according to a second embodiment of the present disclosure.
Figure 14:
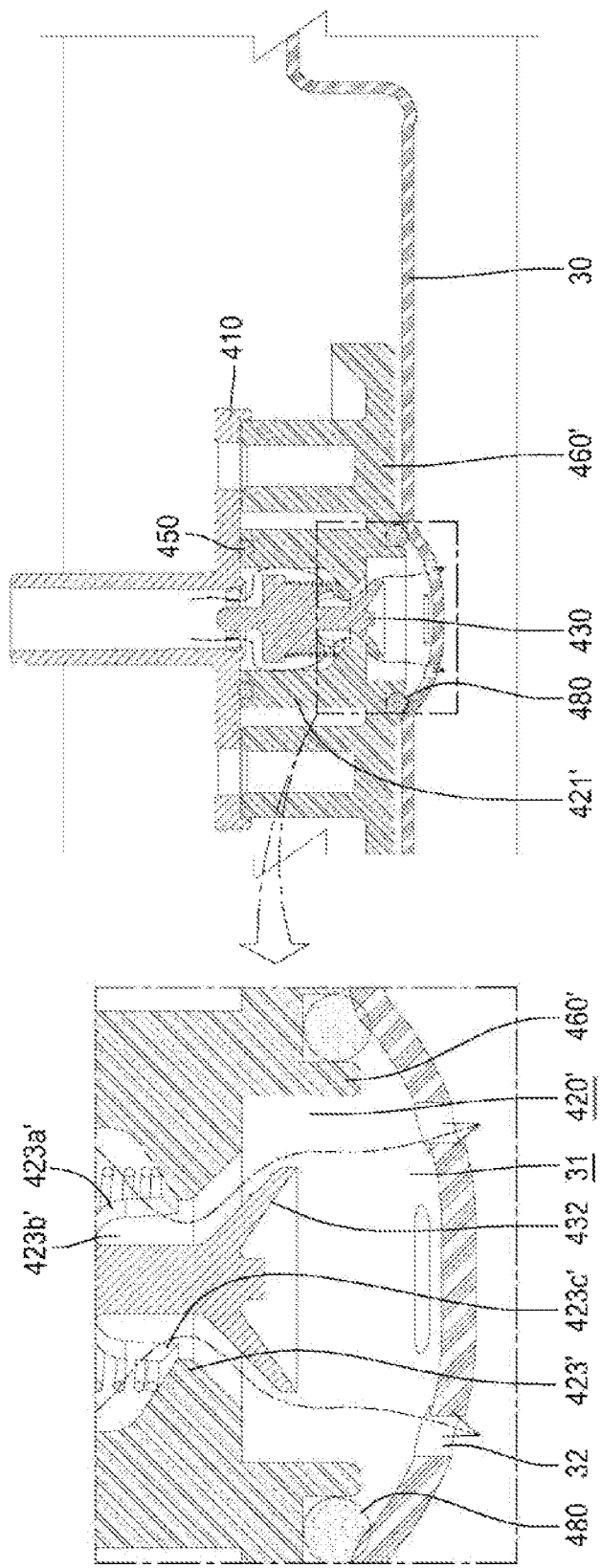
FIG. 14 is a cross-sectional view illustrating an open state after the double sealing check valve for a rice cooker according to the second embodiment of the present disclosure is coupled to a lid.
Figure 15:
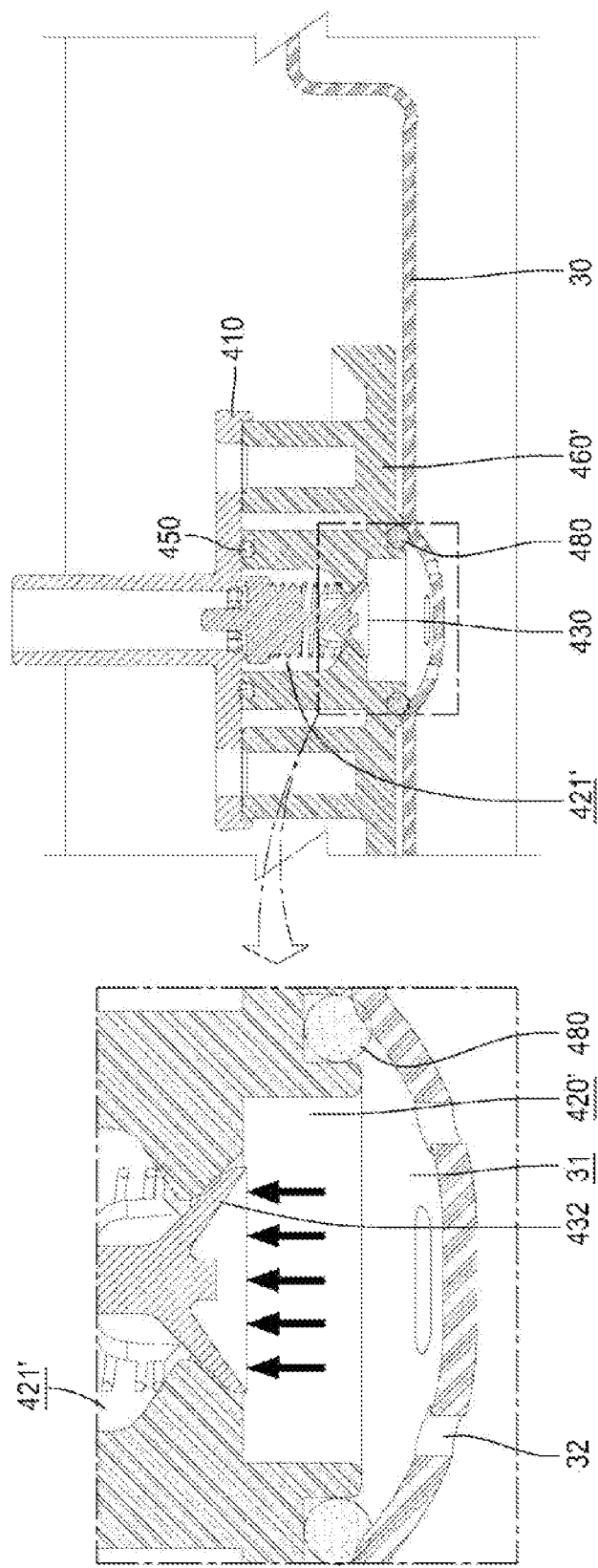
FIG. 15 is a cross-sectional view illustrating a state in which a double sealing check valve for a rice cooker according to the second embodiment of the present disclosure blocks steam after being coupled to a lid.

FIG. 13 is an exploded perspective view of a double sealing check valve for a rice cooker according to a second embodiment of the present disclosure, FIG. 14 is a cross-sectional view illustrating an open state after the double sealing check valve for a rice cooker according to the second embodiment of the present disclosure is coupled to a lid, and FIG. 15 is a cross-sectional view illustrating a state in which a double sealing check valve for a rice cooker according to the second embodiment of the present disclosure blocks steam after being coupled to the lid.

The double sealing check valve for a rice cooker according to the second embodiment of the present disclosure is almost the same as that of the first embodiment, but the lower part is not formed separately and is formed integrally with the fixing plate.

The upper part 410, the check valve 430, the elastic member 440, and the O-ring 450 are the same as those of the first embodiment, and the check valve 430, the elastic member 440, and the O-ring 450 are arranged in a valve installation space 421' formed in a fixing plate 460' and the upper part 410 is fastened. As the fixing plate 460' and the lower part are integrally formed, a water outlet portion 420' is also formed in the fixing plate 460'.

The valve installation space 421' is coupled to the upper part 410, and the water outlet portion 420' is formed below the valve installation space 421'. A small-diameter portion 423' narrowing a diameter and forming an inclined surface is provided between the valve installation space 421' and the water outlet portion 420'.

A shaft hole 423b' through which the check valve 430 to be described later passes is formed in the center of the small-diameter portion 423'. A guide rib 423a' protruding upwardly around the shaft hole 423b of the small-diameter portion 423' is provided. Referring to FIG. 14, a lower end of the elastic member 440 is fixedly supported on an outer periphery of the guide rib 423a'. In addition, the guide rib 423a' is divided into two or more portions to have a gap portion 423c', and the gap portion 423c' serves to discharge water introduced into the valve installation space 421' to the water outlet portion 420'.

When water is supplied, the check valve 430 overcomes the elastic force of the elastic member 440 by water pressure and moves downwardly to open the water supply portion of the upper part 410 and the water outlet portion 420' of the fixing plate 460'. Therefore, water flows out to the protrusion 31 formed in the inner pot lid 30 through the water supply flow path, the water supply portion of the upper part 410, the valve installation space 421', and the water outlet portion 420', and then is introduced into the rice cooker through the water outlet 32 formed in the protrusion 31.

During cooking, the check valve 430 is in a state of closing the water supply portion of the upper part 410 and the water outlet portion 420' of the fixing plate 460' by the elastic member 440, and as steam pressure inside the inner pot of the rice cooker increases, adhesion between the second part 432 and the small-diameter portion 423' of the check valve 430 increases. Therefore, steam mixed with rice water, grain dregs, etc. is blocked, rather than flowing into the valve, thereby providing hygienic water supply and preventing hindrance of the behavior of the elastic member 440 or a degradation of performance. In addition, since high pressure is maintained by increasing airtightness, delicious rice with good texture may be provided.

What is claimed is:

1. A double sealing check valve for a rice cooker that is mounted on a lid of a rice cooker to prevent leakage of steam generated during cooking, the double sealing check valve comprising:
   an upper part having a plate shape and including a water supply portion;
   a check valve opening and closing the water supply portion of the upper part by a vertical movement;
   a lower part coupled to the upper part, allowing the check valve to be installed to be movable up and down therein, and having a flow path and a water outlet portion to allow water introduced through the water supply portion to be discharged; and
   an elastic member having both ends fixed to the upper part check valve and the lower part respectively and pressing the check valve in a direction in which the check valve closes the water supply portion,
   wherein the check valve includes a first part opening and closing the water supply portion of the upper part and a second part opening and closing the water outlet portion of the lower part.

2. The double sealing check valve of claim 1, wherein the check valve includes a guide protrusion protruding into the water supply portion on an upper surface of the first part, and the upper part includes a guide hole guiding the guide protrusion of the check valve.

3. The double sealing check valve of claim 2, wherein the upper part includes one or more water supply ports formed on an outer periphery of the guide hole, and the one or more water supply ports are provided at a lower end of the water supply portion.

4. The double sealing check valve of claim 1, wherein an upper end of the water outlet portion of the lower part has a funnel shape increasing in diameter downwardly, and
   the second part of the check valve has a funnel shape corresponding to the water outlet portion.

5. The double sealing check valve of claim 1, wherein the second part includes one or more annular protruding ribs on a surface in contact with the water outlet portion.

6. The double sealing check valve of claim 1, wherein the check valve has a shaft portion connecting the first part to the second part, and the lower part includes a shaft hole through which the shaft portion passes.

7. The double sealing check valve of claim 6, wherein the lower part includes one or more water outlet ports arranged on the outside of the shaft hole, and the one or more water outlet ports are connected to the water outlet portion.

8. The double sealing check valve of claim 6, wherein the lower part includes a plurality of guide ribs surrounding the shaft hole and protruding upwardly and a gap portion between the plurality of guide ribs, wherein water flows into the water outlet portion through the gap portion.

9. The double sealing check valve of claim 1, further comprising: an O-ring for sealing interposed in a contact surface of the lower part and the upper part.

10. The double sealing check valve of claim 1, wherein the lower part is integrated with a fixing plate fixing the check valve to the lid.

* * * * *